(12) United States Patent
Chapman et al.

(10) Patent No.: US 8,768,736 B1
(45) Date of Patent: Jul. 1, 2014

(54) TRACKING CUSTOMER SPENDING

(75) Inventors: Michael Aaron Chapman, Chicago, IL (US); Hyun Jin Ko, Evanston, IL (US); Rodney Hal Monson, Waukegan, IL (US); Mark Alexander Jones, Evanston, IL (US); Bryan L. Mackrell, Pittsburgh, PA (US); Michael S. Ley, Moon Township, PA (US); Thomas S. Kunz, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 943 days.

(21) Appl. No.: 12/152,028

(22) Filed: May 12, 2008

(51) Int. Cl.
*G06Q 40/00* (2012.01)

(52) U.S. Cl.
USPC ........................................ 705/7.11; 705/26

(58) Field of Classification Search
USPC ............................................................ 705/7
See application file for complete search history.

(56) References Cited

U.S. PATENT DOCUMENTS

| | | |
|---|---|---|
| 4,367,402 A | 1/1983 | Giraud et al. |
| 4,443,027 A | 4/1984 | McNeely et al. |
| 4,837,422 A | 6/1989 | Dethloff et al. |
| 5,500,513 A | 3/1996 | Langhans et al. |
| 5,621,640 A | 4/1997 | Burke |
| 5,649,118 A | 7/1997 | Carlisle et al. |
| 5,845,260 A | 12/1998 | Nakano et al. |
| 5,953,710 A | 9/1999 | Fleming |
| 5,963,925 A | 10/1999 | Kolling et al. |
| 5,991,749 A | 11/1999 | Morrill, Jr. |
| 6,032,134 A | 2/2000 | Weissman |
| 6,052,675 A | 4/2000 | Checchio |
| 6,088,682 A | 7/2000 | Burke |
| 6,112,191 A | 8/2000 | Burke |
| 6,128,603 A | 10/2000 | Dent et al. |
| 6,173,269 B1 * | 1/2001 | Solokl et al. .................... 705/35 |
| 6,353,811 B1 | 3/2002 | Weissman |
| 6,411,938 B1 | 6/2002 | Gates et al. |
| 6,493,685 B1 | 12/2002 | Ensel et al. |
| 6,636,833 B1 | 10/2003 | Flitcroft et al. |

(Continued)

FOREIGN PATENT DOCUMENTS

| | | |
|---|---|---|
| WO | WO 96/34358 A1 | 10/1996 |
| WO | WO 03/030054 A1 | 4/2003 |

OTHER PUBLICATIONS

Richard Craver; Cost Conscious; Companies Increasingly Travel by Web or Videoconferences to Save on Airfare, Hotels; Tracking Expenses: Corporate Credit Cards Drive Compliance; Journal Reporter; Winston-Salem Aug. 20, 2006:1.*

(Continued)

*Primary Examiner* — Ella Colbert
*Assistant Examiner* — Michael Cranford
(74) *Attorney, Agent, or Firm* — Buchanan Ingersoll & Rooney PC; Robert J. Pugh

(57) ABSTRACT

Methods for tracking customer spending: the methods may comprise receiving from the customer a first threshold amount and a period length; receiving a transaction indication for each debit transaction made by the customer during a first period; and alerting the customer if the sum of the amounts of debit transactions during the first period exceeds the first threshold amount. The methods may also comprise receiving a transaction indication for each debit transaction made by the customer during a second period; and alerting the customer if the sum of the amounts of debit transactions during the second period exceeds a second threshold amount.

23 Claims, 4 Drawing Sheets

(56) References Cited

U.S. PATENT DOCUMENTS

| | | |
|---|---|---|
| 6,742,704 B2 | 6/2004 | Fitzmaurice et al. |
| 6,839,687 B1 | 1/2005 | Dent et al. |
| 6,839,692 B2 | 1/2005 | Carrott et al. |
| 6,876,971 B1 | 4/2005 | Burke |
| 6,993,510 B2 | 1/2006 | Guy et al. |
| 7,031,939 B1 | 4/2006 | Gallagher et al. |
| 7,039,440 B2 | 5/2006 | Rodriguez et al. |
| 7,076,465 B1 | 7/2006 | Blagg et al. |
| 7,110,979 B2 | 9/2006 | Tree |
| 7,146,338 B2 | 12/2006 | Kight et al. |
| 7,147,149 B2 | 12/2006 | Giraldin et al. |
| 7,171,370 B2 | 1/2007 | Burke |
| 7,175,073 B2 | 2/2007 | Kelley et al. |
| 7,249,092 B2 | 7/2007 | Dunn et al. |
| 7,249,097 B2 | 7/2007 | Hutchison et al. |
| 7,264,153 B1 | 9/2007 | Burke |
| 7,328,839 B2 | 2/2008 | Keohane et al. |
| 7,502,758 B2 | 3/2009 | Burke |
| 7,536,351 B2 | 5/2009 | Leblang et al. |
| 7,571,849 B2 | 8/2009 | Burke |
| 2001/0037315 A1 | 11/2001 | Saliba et al. |
| 2001/0047310 A1* | 11/2001 | Russell .......................... 705/26 |
| 2002/0123949 A1 | 9/2002 | VanLeeuwen |
| 2003/0028483 A1 | 2/2003 | Sanders et al. |
| 2003/0050889 A1 | 3/2003 | Burke |
| 2003/0083930 A1 | 5/2003 | Burke |
| 2006/0122923 A1 | 6/2006 | Burke |
| 2007/0005496 A1 | 1/2007 | Cataline et al. |
| 2007/0034688 A1 | 2/2007 | Burke |
| 2007/0061252 A1 | 3/2007 | Burke |
| 2007/0061257 A1 | 3/2007 | Neofytides et al. |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0162387 A1 | 7/2007 | Cataline et al. |
| 2007/0214162 A1 | 9/2007 | Rice |
| 2008/0120129 A1* | 5/2008 | Seubert et al. .................... 705/1 |
| 2009/0204538 A1 | 8/2009 | Ley et al. |

OTHER PUBLICATIONS

Joumard, Isabelle; Enhancing the Cost Effectiveness of Public Spending: Experience in OECD Countries; OECD Economic Studies 37; Jul. 2003-Sep. 2003.*
Jameson Boex, LF; Multi-Year Budgeting: A Preview of International Practices and Lessons for Developing and Transitional Economies; Public Budgeting & Finance 20.2 Summer 2000:91-112.*
U.S. Appl. No. 12/152,073, filed May 12, 2008.
U.S. Appl. No. 12/152,074, filed May 12, 2008.
U.S. Appl. No. 12/120,995, filed May 15, 2008.
U.S. Appl. No. 12/172,541, filed Jul. 14, 2008.
U.S. Appl. No. 12/479,378, filed Jun. 5, 2009.
Ronald Lipman, "Adding family to credit card not always wise," *Houston Chronicle*, dated Jan. 18, 2008, printed from chron.com, 2 pages.
Lawrence Kutner, "Parent & Child," *The New York Times*, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.
Jane J. Kim, "Managing Your Money in Public View," *The Wall Street Journal*, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 8 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=HomePage, Internet site, accessed on Apr. 11, 2008, 1 page.
"Use Buxfer's analytics to *understand* your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPay Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=_flow&SESSION=6paX9BKc4FK4EJ8, Internet site, accessed on Sep. 18, 2007, 1 page.
"Review Payment Details—PayPal," printed from https://www.paypal.com/us/cgi-bin/webscr?cmd=_flow&SESSION=RMXX7KRmInYnF, Internet site, accessed on Sep. 18, 2007, 1 page.
"Savings Plan," printed from http:/quicken.intuit.com/images/screenshots/ss_savings_plan_lrg.gif, Internet site, accessed on Mar. 19, 2008, 1 page.
"Quicken Deluxe 2008," printed from http://quicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.

(56) References Cited

OTHER PUBLICATIONS

Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.

Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.

Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.

John R. Quain, "Cellphone Banking is Coming of Age," dated May 24, 2007, printed from http://www.nytimes.com/2007/05/24/technology/24basics.html?_r=1&oref=slogin, Internet site, accessed on Oct. 12, 2007, 4 pages.

"Ducont—Mobile Payments," printed from http://www.ducont.com/Products/bnf_mdhm.htm, Internet site, accessed on Oct. 11, 2007, 1 page.

"Ducont—Bank.companion," printed from http://www.ducont.com/Products/bnf_bankcomp.htm, Internet site, accessed on Oct. 11, 2007, 1 page.

"MyCheckFree.com," printed from https://mycheckfree.com/br/wps?sp=10001&rg=bfbl, Internet site, accessed on Sep. 14, 2007, 1 page.

"About CheckFree," printed from https://mycheckfree.com/br/wps?rq=login&slpg=Y&file=authentication/login_baseline_about-checkfree&esc=93096239&sp=, Internet site, accessed on Sep. 14, 2007, 1 page.

"MyCheckFree—Frequently Asked Questions," printed from https://mycheckfree.com/br/wps?rq=login&slpg=Y&file=authentication/login_baseline_faq&esc=93096239&sp=10001, Internet site, accessed on Sep. 14, 2007, 5 pages.

"Paytrust : Paying Bills Has Never Been Easier," printed from http://www.paytrust.com/learnmore.shtml, Internet site, accessed on Sep. 14, 2007, 2 pages.

"Why Use Paytrust® Instead of a Traditional Bill-Pay Service?" printed from http://www.paytrust.com/morethanbillpay.shtml, Internet site, accessed on Sep. 14, 2007, 3 pages.

"Paytrust: Frequently Asked Questions," printed from http://www.paytrust.com/commonquestions.shtml, Internet site, accessed on Sep. 14, 2007, 5 pages.

Richard Irons, "What is Envelope Budgeting—Why the Envelope Budgeting System is so Effective?" printed from http://www.mvelopes.com/articles/envelope-budgeting.php, Internet site, 2 pages.

"Pocket Quicken," printed from http://www.landware.com/pocketquicken, Internet site, accessed on Sep. 14, 2007, 2 pages.

"Mobile Quicken™—Stand Alone or Connect with a Click," printed from http://www.landware.com/pocketquicken/moreinfo.html, Internet site, accessed on Sep. 14, 2007, 4 pages.

"UnitedOne Credit Union," printed from http://www.unitedone.org/ASP/home.asp, Internet site, accessed on Sep. 14, 2007, 3 pages.

"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.

"Quicken Starter Edition 2008," printed from http://quicken.intuit.com/personal-finance/starter-edition-personal-budget.jhtml, Internet site, accessed on Sep. 14, 2007, 5 pages.

"Jul. 2007 calendar," printed from http://quicken.intuit.com/images/screenshots/ss_calendar_lrg.gif, Internet site, accessed on Sep. 14, 2007, 1 page.

"Navigator," dated Jul. 2006, printed from www.pscu.org, Internet site accessed on Oct. 17, 2007, 2 pages.

"Bank of America Privacy Assist Premier™—Protect your credit and identity," printed from http://www.bankofamerica.com/pap/index.cfm?template=pap_assist premier, Internet site, accessed on Oct. 17, 2007, 2 pages.

"Identity Theft Protection—Bank of America Privacy Assist Premierm™," printed from http://www.bankofamerica.com/pap/index.cfm?template=pap_assist_premier, Internet site, accessed on Oct. 17, 2007, 2 pages.

"Bank of America—Online Bill Pay and e-Bills Frequently Asked Questions," printed from http://www.bankofamerica.com/onlinebanking/index.cfm?template=faq_billpay, Internet site, accessed on Oct. 17, 2007, 2 pages.

"Technology Credit Union," printed from http://www.techcu.com/resources/about_tech_cu/privacy/online.htm, Internet site, accessed on Oct. 17, 2007, 1 page.

"Billshare.org—Make Bill Paying with Roomies Easy—KillerStartups.com," printed from http://www.killerstartups.com/Web20/billshare--Make-Bill-Paving-with-Roomies-Easy/, Internet site, accessed on Sep. 18, 2007, 4 pages.

Every Penny Counts, Inc., Patent Property Due Diligence Chart, prepared Aug. 30, 2007, 8 pages.

Office Action dated Apr. 29, 2009 for U.S. Appl. No. 12/172,541, filed Jul. 14, 2008.

\* cited by examiner

TRACKING CUSTOMER SPENDING

BACKGROUND

Banking institutions frequently offer Internet banking products and services to their customers as an alternative to traditional "brick and mortar" banking channels. Such products and services are typically provided via a user interface (UI) of a secure banking Web site that is hosted by the bank and that is remotely accessible by its customers using, for example, a personal computer (PC), automated teller machine (ATM) or other network-enabled device. Products and services that may be offered to Internet banking customers include, for example, account balance inquiries, electronic funds transfers, transaction information downloads, bill presentment and payment, loan applications, and investment services.

Account balance inquiry products typically allow customers to remotely view a balance of one or more of their accounts. These existing products, however, require a customer to make an active inquiry in order to view account balances.

FIGURES

FIG. 2A illustrates one embodiment of the interface displaying a tracking page;

FIG. 2A illustrates one embodiment the user interface of FIGS. 2A-2E displaying a tracking page;

FIG. 2B illustrates one embodiment of the user interface of FIGS. 2A-2E showing the tracking page of FIG. 2A configured to receive a threshold amount;

FIG. 2C illustrates one embodiment of the user interface of FIGS. 2A-2E showing the tracking page of FIG. 2A after a threshold amount has been received;

FIG. 2D illustrates one embodiment of the user interface of FIGS. 2A-2E illustrating an alert page;

FIG. 2E illustrates one embodiment of the user interface of FIGS. 2A-2E illustrating the tracking page of FIG. 2A after the threshold amount has been exceeded;

DESCRIPTION

Various embodiments may be directed to products for tracking customer spending and allowing customers to track their own spending. For example, customers of a financial institution may be able to set a spending threshold, which may be in effect for a given time period. The financial institution may then track spending transactions of the customer. For example, the financial institution may track payment requests directed to one or more of the customer's financial accounts by vendors. When the customer's spending exceeds the threshold, the financial institution may alert the customer, for example, by sending an alert to the customer's mobile phone or other mobile device. In this way, the customer may track spending and improve budgeting.

Figure 1:
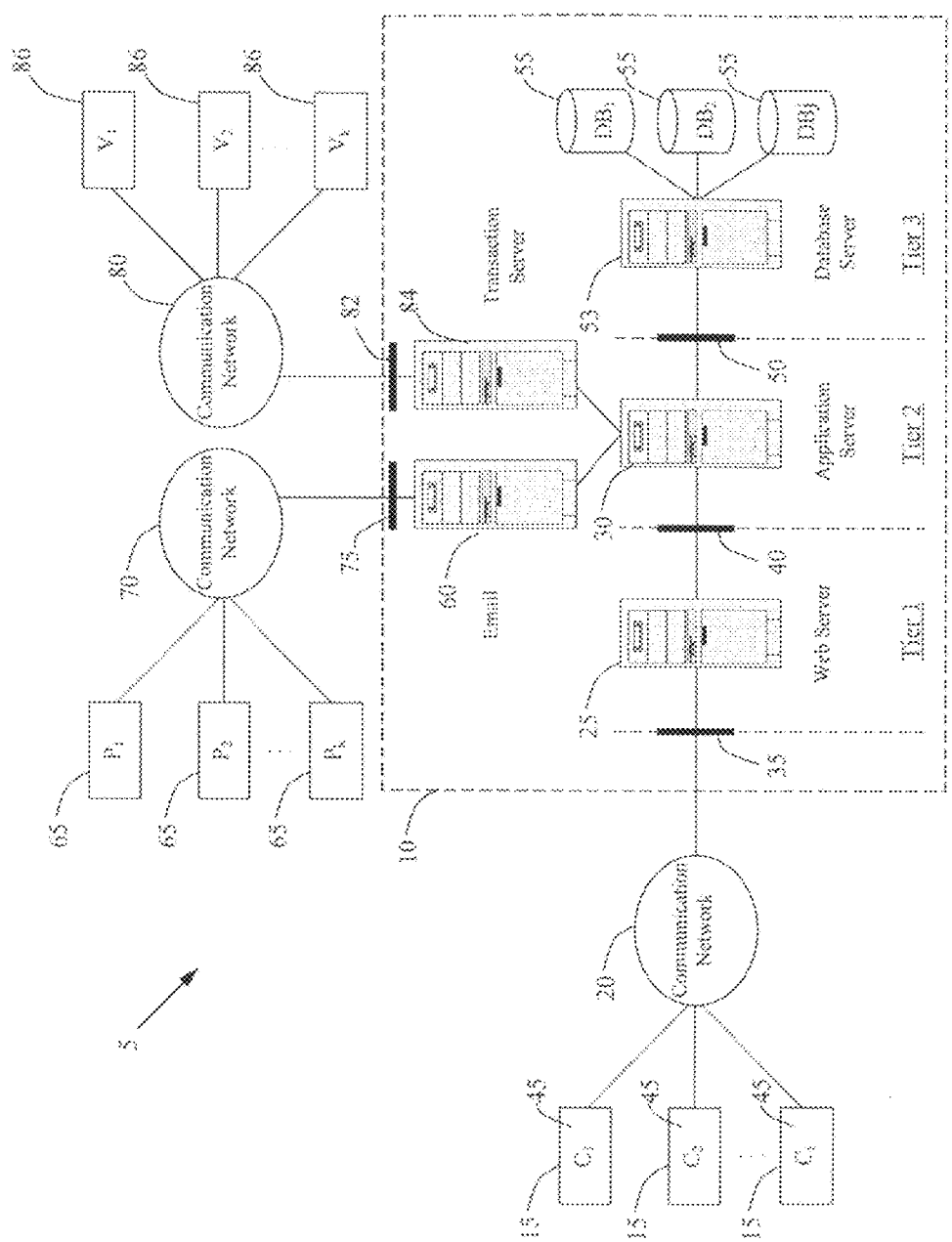
FIG. 1 illustrates one embodiment of a system, which may be implemented by a financial institution to provide network-based banking products for its customers.

FIG. 1 illustrates one embodiment of a system 5, which may be implemented by a financial institution to provide network-based banking products for its customers, including products for tracking spending, as described herein. Other examples of banking products provided by the system may include, for example, bill payment, customer purchases, monetary transfers between accounts and between parties, etc. As shown, the system 5 may include a host system 10 in communication with one or more client devices 15 (hereinafter "clients") via a communication network 20. Each client 15 may be associated with one or more customers of the financial institution and may allow the customers to access the network-based banking products. The network 20 may be any suitable wired or wireless, public or private communications network suitable for enabling the exchange of information between the host system 10 and the clients 15. For example, the network 20 may be partially or completely comprised of one or more of the Internet, a Public Switched Telephone Network (PSTN), a cellular or mobile telephone network, etc.

The host system 10 may be constructed and arranged with any suitable combination of components. For example, according to various embodiments, the host system 10 may be arranged in a tiered network architecture and include a Web server 25, an application server 30, and a database server 35. The Web server 25 may correspond to a first tier of the host system 10 and may communicate with the communication network 20 (e.g., the Internet) and the application server 30 via a border firewall 35 and an application firewall 40, respectively. The Web server 25 may be configured to accept requests from one or more of the clients 15 via the communication network 20 and provide responses. The requests and responses may be formatted according to Hypertext Transfer Protocol (HTTP) or any other suitable format. The responses may include, for example, static and/or dynamic documents for providing an Internet banking user interface (UI) 45 to customers via the clients 15. The documents may be formatted according to the Hypertext Markup Language (HTML) or any other suitable format. The Web server 25 may further be configured to authenticate each customer's credentials before allowing access to the UI 45 and other banking resources. Such authentication may be performed, for example, using a user name and a password. Additional security measures may be utilized in the authentication process if desired.

A second tier of the host system 10 may comprise an application server 30. The application server 30 may communicate with the Web server 25 and the data base server 35 (e.g., Tier 3) via the application firewall 40 and an internal firewall 50, respectively. The application server 30 may host one or more Internet banking applications for executing the business logic associated with Internet banking features of the UI 45. The application server 30 may receive customer-entered information from the UI 45 of each client 15 via the Web server 25. Such information may include, for example, a user name and password, customer requests to access particular Internet banking features, etc. Based on this and other information received from the clients 15 via the Web server 25, the application server 30 may perform transactions (e.g., transfer funds between accounts, retrieve account balances, transfer amounts to other customer, etc.) and generate corresponding informational content (e.g., transfer confirmations, account balance information, etc.). Information regarding such transactions may be communicated to the Web server 25 and subsequently presented to the customers using, for example, a dynamic Web page of the UI 45.

The third tier of the host system 10 may comprise a database server 35, which may communicate with the application server 30 via the internal firewall 50. The database server 35 may manage one or more databases 55 containing data necessary for supporting one or more Internet banking features. Such databases may include, for example, an account information database, a customer information database, a customer preferences/settings database, as well as other databases for storing additional settings and/or configurations. Such information may be retrieved, processed and updated as needed by the application server 30 based on the particular Internet banking features(s) being used.

The clients 15 may include any suitable network-enabled devices such as, for example, personal computers (PC's), automated teller machines (ATM's), palmtop computers, mobile phones, etc. The clients 15 may be configured to transmit and receive information via the communication network 20 using a wired or wireless connection, and may include a suitable browser software application including, for example, MICROSOFT INTERNET EXPLORER, MICROSOFT INTERNET EXPLORER MOBILE, MOZILLA FIREFOX, PALM BLAZER, etc.) for enabling the customer to display, enter and interact with information exchanged via the communication network 20. The clients 15 may thus access and navigate static and/or dynamic HTML documents of the Internet banking UI 45.

The host system 10 may further include an e-mail server 60 in communication with the application server 30 for enabling the exchange of electronic communications between clients 15 and one more parties 65 externally located with respect to the host system 10. Electronic communications may be exchanged between the e-mail server 60 and the parties 65 via a communication network 70. Although the communication network 70 is depicted separately from the communication network 20 in FIG. 1, it will be appreciated that the communication networks 20, 70 may be implemented using a common communication network (e.g., the Internet, the PSTN, a cellular or other mobile network, or combinations thereof). According to various embodiments, the e-mail server 60 and/or the application server 30 may implement an account for some or all of the customers associated with parties 65 or clients 15. Each customer's account may be accessible by the customer and may include communications directed to the customer including, for example, electronic bills, transfer requests, etc. In certain embodiments and as shown in FIG. 1, the host system 10 may include an e-mail firewall 75 disposed between the e-mail server 60 and the communication network. The e-mail server 60 may implement an e-mail server application for handling the transfer of electronic communications to and from other e-mail servers and e-mail clients (e.g., clients 45 and parties 65) using any suitable e-mail protocols and standards.

Generally, a party 65 may be any person or entity with whom a client 15 desires to communicate regarding specific aspects of his finances or financial matters generally. As discussed above, such parties may include, for example, billing parties (e.g., utility companies, credit card companies, etc.). Billing parties may present to the host system 10 electronic bills payable by customers associated with clients 15. The electronic bills may be posted to a customer's account, allowing the customer to pay the bills with a transfer from a financial account. A financial account may be any type of account held by a customer at a financial institution where the financial institution keeps funds of the customer (e.g., a checking account, a savings account, an investment account, etc.). According to various embodiments, parties 65 may also be non-billing parties who have an ongoing financial relationship with a customer (e.g., roommates or business partners of other customers or other parties who have need to communicate with customers utilizing clients 15).

According to various embodiments, the host system 10 may also comprise a transaction server 84 in communication with the application server 30. The transaction server 84 may enable transactions between customers and vendors 86. For example, the transaction server 84 may implement functionality allowing customers to remit payment to one of the vendors 86 directly from one of their financial accounts. Such transactions may be referred to as debit transactions. Debit transactions may be communicated from the vendors 86 to the transaction server 84 via communication network 80. Again, although the network 80 is depicted separately from networks 70 and 20, the networks 70, 20, and 80 may be implemented utilizing a common communication network such as, for example, the Internet, the PSTN, a cellular or other mobile network, etc. In various embodiments, however, the network 80 may be implemented as a secure proprietary network (e.g., a network implemented by VISA, MASTERCARD or other similar transaction companies). As shown in FIG. 1, a transaction firewall 82 may be present between the transaction server 84 and the communication network 80.

Customers may remit payment to a vendor 86, for example, by producing to the vendor 86 a debit card, check card or other proof of their financial account at the financial institution implementing the system 10. This may be accomplished in person or, according to various embodiments, over the Internet. The customer may authorize a debit transaction in any suitable way including, for example, providing a signature, providing a personal identification number (PIN), etc. When a debit transaction is authorized, the vendor 86 may generate a request for payment, which is communicated to the transaction server 84 via the communication network 80. When a request for payment is received from a vendor 86, the transaction server 84 and/or the application server 30 may take appropriate steps to remit payment to the vendor 86 from a financial account (e.g., a checking account) of the customer. For example, a hold may be initially placed on funds in the customer's financial account equal to the amount of the request for payment. The amount may be subsequently transferred to an account of the vendor 86 according to any suitable methods.

Figure 2A:
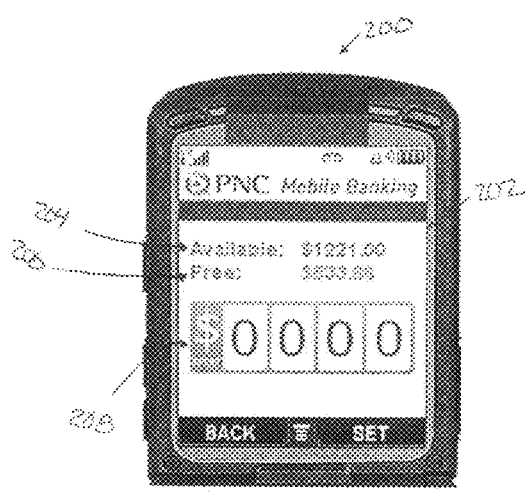
FIGS. 2A-2E illustrate various embodiments of a user interface 200 that may be provided to a customer to implement a tool for tracking spending.

According to various embodiments, the system 10 may provide customers with a product to track spending. For example, FIGS. 2A-2E illustrate various embodiments of a user interface 200 that may be provided to a customer to implement a tool for tracking spending. The interface 200 may be an embodiment of the UI 45 described above. For example, the interface 200 may be provided to a client 15 utilized by the customer including, for example, an automated teller machine (ATM), a mobile phone, a palmtop computer, etc. FIG. 2A illustrates one embodiment the interface 200 displaying a tracking page 202. The tracking page 202 may include an available amount field 204, a free amount field 206 and an amount spent field 208. The available amount field 204 may display an amount of money available in one or more financial accounts of the customer. The free amount field 206 may indicate a portion of the available amount 204 that is not already committed to another use. For example, the free amount may be calculated considering anticipated bills and other payments to be made by the customer. The amount spent field 208 may show an amount spent by the customer (e.g., in the form of debit transactions) since a start point. The start point may be set by the customer, or may be the start point of a period, as described herein. According to various embodiments, the start point may be the time at which a threshold amount is received.

Figure 2B:
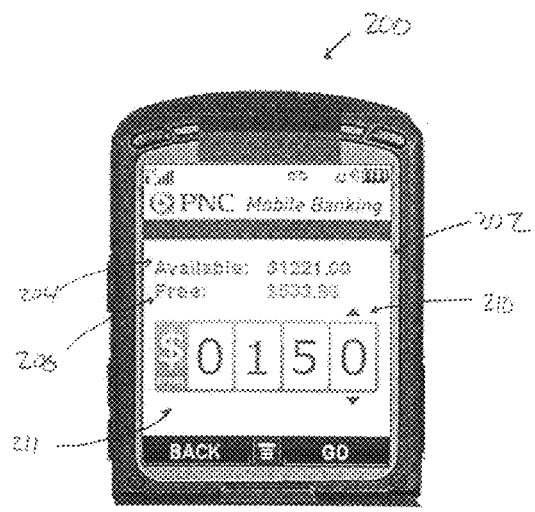
Figure 3:
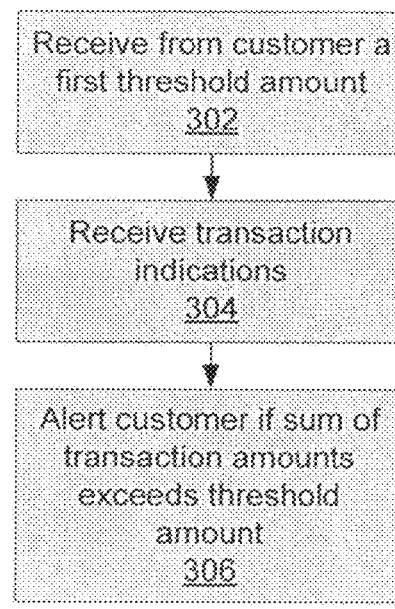
FIG. 3 is a flow chart illustrating one embodiment of a process flow for tracking customer spending.

FIG. 3 is a flow chart illustrating one embodiment of a process flow 300 for tracking customer spending. At box 302, the system 10 may receive an indication of a threshold amount from the customer (e.g., via a client 15). The threshold amount may be a level of spending that, when reached, triggers the system 10 to alert the customer. According to various embodiments the system 10 may prevent the threshold amount from exceeding one or both of the available amount and the free amount. The system 10 may receive the threshold amount according to any suitable user interface or other input method including, for example, via the user interface 200. FIG. 2B illustrates one embodiment of the user interface 200 showing the tracking page 202 configured to receive a threshold amount. The threshold amount is shown at field 211. The customer may enter and/or modify the threshold amount utilizing the cursor 210. For example, when the cursor 210 is placed over a digit of the field 211, the customer may modify the digit by selecting an up or down button on an input device such as a keypad (not shown). Various other input methods may be used in addition to or instead of that shown in FIG. 2B. For example, the customer may input the threshold amount from a keypad.

Figure 2C:
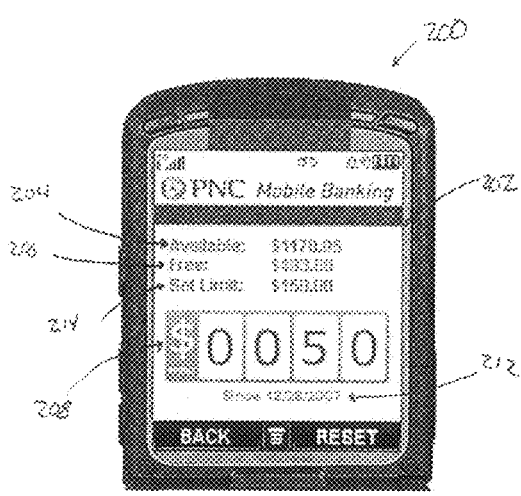

FIG. 2C illustrates one embodiment of the user interface 200 showing the tracking page 202 after a threshold amount has been received. As shown, the amount spent field 208 is configured to display an amount spent (e.g., in the form of debit transactions) since a start date, which is indicated at start date field 212. This may give the customer an indication of how close the customer is to the threshold amount. For example, the start date may be the date when the threshold amount was set, or may be any date or time selected by the customer. In addition to the available amount field 203 and the free amount field 206, the embodiment shown in FIG. 2C may also comprise a Set Limit field 214, which displays the threshold amount.

Figure 2D:
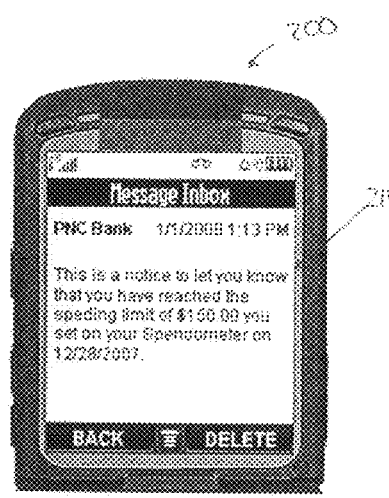

At box 304, the system 10 may receive indications of debit transactions drawing from a financial account or accounts of the customer. An indication of a debit transaction may comprise an amount of the debit transaction. The system 10 (e.g., the application server 30) may be sum the amounts of the debit transactions received since the start date. When the user interface 200 is utilized, this amount may be displayed at start date field 212. If the sum of the debit transaction amounts exceeds the threshold amount, the system 10 may alert the customer of this occurrence. For example, the system 10 may direct an e-mail, text message, such as a Short Message Service (SMS) message, or other alert to a client 15 associated with the customer. FIG. 2D illustrates one embodiment of the user interface 200 illustrating an alert page 214. As shown, the alert page 214 indicates that the threshold amount has been exceeded, along with the an indication of the threshold amount and the start date. Various other information may be included in an alert in addition to or instead of that shown. For example, the available and free amounts may be displayed.

Figure 2E:
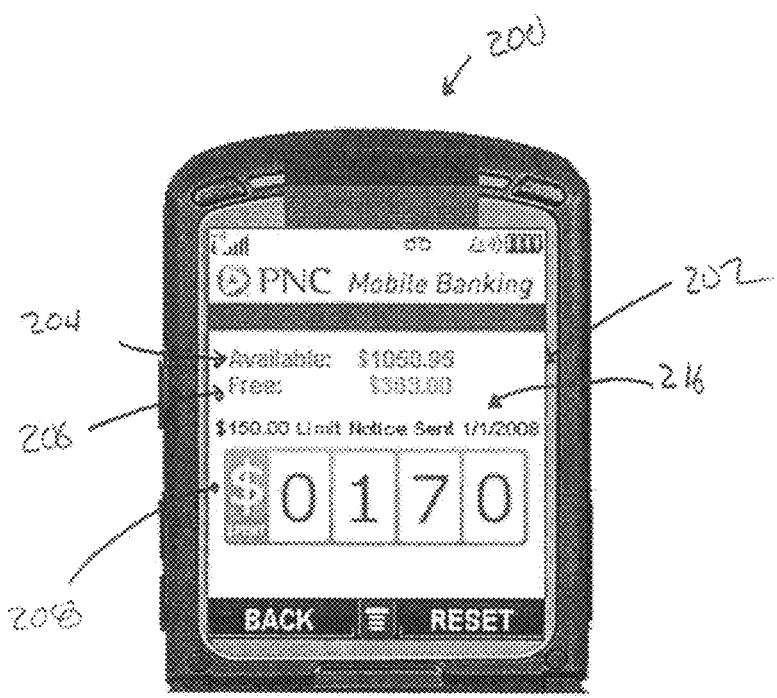

FIG. 2E illustrates one embodiment of the user interface 200 illustrating the tracking page 202 after the threshold amount has been exceeded. The amount spent field 208 may indicate the amount since the start date, although the amount listed may be in excess of the threshold amount. An additional field 216 may indicate that a threshold amount alert was sent to the customer and may also indicate the date of the threshold amount alert.

According to various embodiments, the system 10 may include functionality for alerting the customer after each debit transaction is received and/or processed by the system 10. For example, a debit transaction alert may comprise an indication of an amount of the debit transaction, the vendor 86 submitting the debit transaction, the available amount and free amounts considering the debit transaction, etc.

Figure 4:
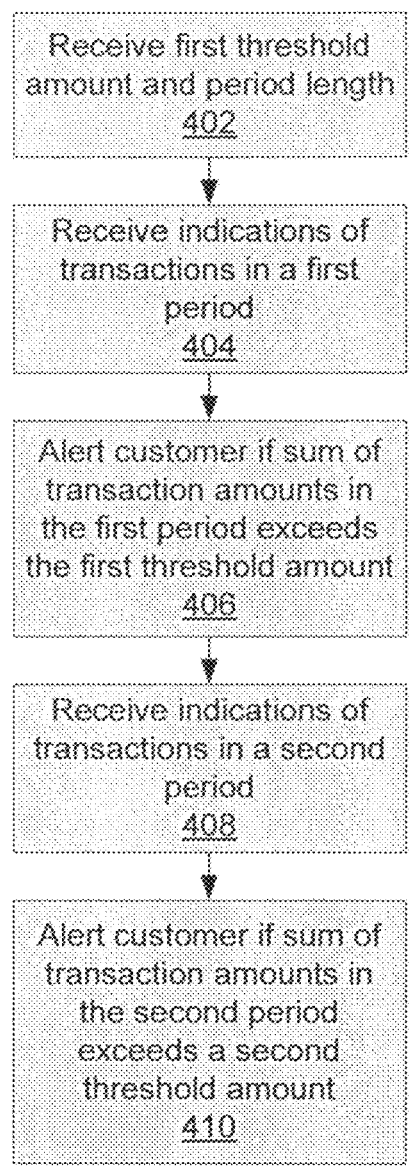
FIG. 4 is a flowchart illustrating one embodiment of a process flow for periodically tracking customer spending.

FIG. 4 is a flowchart illustrating one embodiment of a process flow 400 for periodically tracking customer spending. It will be appreciated that the process flow 400 may be implemented utilizing the user interface 200 described above, or any other suitable user interface. At box 402, the system 10 may receive a first threshold amount and a period length. The period length may be an amount of time (e.g., a number of hours, a number of days, a number of weeks, etc.).

At box 404, the system 10 may receive indications of debit transactions in a first period. The indications of debit transactions may comprise an amount of each debit transaction, as described herein. The first period may begin at a start date and extend for the period length received at box 402. The start date may be determined as set forth above. If the sum of the amounts of debit transactions occurring during the first period exceeds the first threshold amount, the system 10 may, at box 406, alert the customer, for example, in a manner similar to that described above with respect to box 306.

At box 408, the system 10 may receive indications of debit transactions in a second period. The second period may begin at the end of the first period, and may extend for the period length. If the sum of debit transactions occurring during the second period exceeds a second threshold amount, the system 10 may, at box 410, alert the customer, for example, in a manner similar to that described above with respect to box 306. The second threshold amount may be received from the customer and, in various embodiments, may be equal to the first threshold amount. It will be appreciated that although two periods are illustrated in the process flow 400, the process will continue in some embodiments to include additional periods. The number of periods may be set by the customer. According to various embodiments, the system 10 may continue to implement the process flow 400, including additional periods, until a stop instruction is received from the customer.

According to various embodiments, the system 10 may implement the process flow 300 and/or the process flow 400 with tiered thresholds. For example, the customer may provide a first threshold and a second threshold for a given period. The system 10 may alert the customer when the sum of debit transaction amounts for the given period exceeds the first threshold, as described herein. In addition, the system 10 may alert the customer an additional time if the sum of debit transaction amounts for the given period exceeds the second threshold. The second alert may indicate that the second threshold has been exceeded. In various embodiments, the second alert may also indicate that the first threshold has already been exceeded. Any number of tiered thresholds may be utilized.

Also, according to various embodiments, the system 10 may distinguish between different categories of debit transactions, with different threshold amounts associated with each. The threshold amounts may be received from a customer, as described above. The categories may correspond to different types of spending by the customer. Example categories may include groceries, utilities, auto expenses, clothing, entertainment, etc. The system 10 may determine the category of a given debit transaction according to any suitable method. For example, the system 10 may determine the category of a debit transaction considering the vendor 86 submitting the debit transaction. When the sum of the amounts of debit transactions in a given category exceeds the threshold amount associated with that category, the customer may be alerted, as described herein. Alerting the customer may comprise indicating to the customer some or all of the relevant category, the associated threshold amount, the amount available and the amount free.

It will be appreciated that the various embodiments described herein may be implemented in combination with one another. For example, the embodiments described above with respect to the process flows 300 and 400 may be implemented to include tiered thresholds and/or category-specific thresholds.

As used herein, a "computer" or "computer system" may be, for example and without limitation, either alone or in combination, a personal computer (PC), server-based computer, main frame, server, microcomputer, minicomputer, laptop, personal data assistant (PDA), mobile phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A computer-implemented method for tracking customer spending, the method comprising:
   receiving by a computer device a first threshold amount and a period length from the customer, wherein the computer device comprises a processor and operatively associated memory;
   receiving by the computer device an electronic transaction indication for each debit transaction made by the customer during a first period, wherein a length of the first period is equal to the period length, wherein a transaction indication comprises an amount of the debit transaction, and wherein the amount of the debit transaction is an amount deducted from a financial account of the customer as a result of the debit transaction;
   when a sum of debit transactions made by the customer during the first period reaches the first threshold amount, sending, by the computer device, an electronic alert to a mobile device associated with the customer, wherein the electronic alert comprises an indication of the sum of the amounts of debit transactions made by the customer during the first period, an indication of the first threshold amount, and an indication of a portion of the financial account that is not committed to another use;
   receiving by the computer device a transaction indication for each debit transaction made by the customer during a second period, wherein the second period begins at a conclusion of the first period, and wherein a length of the second period is equal to the period length; and
   when a sum of debit transactions made by the customer during the second period reaches a second threshold amount, sending, by the computer device, an electronic alert to the mobile device associated with the customer, wherein the electronic alert comprises an indication of the sum of the amounts of debit transactions made by the customer during the second period, an indication of the second threshold amount, and an indication of the portion of the financial account that is not committed to another use.

2. The method of claim 1, wherein the second threshold amount is equal to the first threshold amount.

3. The method of claim 1, further comprising receiving the second threshold amount from the customer.

4. The method of claim 1, further comprising displaying the sum of the amounts of debit transactions during the first period.

5. The method of claim 1, further comprising sending a notification to the customer upon receiving each transaction indication, wherein the notification comprises an indication of an amount of the debit transaction and a balance of the financial account considering the amount to be deducted from the financial account of the customer.

6. The method of claim 1, further comprising:
   receiving from the customer a third threshold amount, wherein the third threshold amount is higher than the first threshold amount; and
   when the sum of debit transactions made by the customer during the first period reaches the third threshold amount, sending, by the computer device, an electronic alert to the mobile device associated with the customer, wherein the electronic alert comprises an indication of the sum of the amounts of debit transactions made by the customer during the first period, and an indication of the third threshold amount.

7. The method of claim 6, wherein the electronic alert sent when the sum of debit transactions made by the customer during the first period reaches the third threshold comprises an indication that the first threshold amount has already been exceeded during the first period.

8. The method of claim 1, further comprising preventing a debit transaction if completing the debit transaction would cause the sum of the amounts of debit transactions during the first period to exceed the first threshold amount.

9. The method of claim 1, wherein the mobile device is selected from the group consisting of a mobile phone; and a palmtop computer.

10. A system for tracking customer spending, the system comprising at least one processor and operatively associated electronic memory, wherein the memory comprises instructions that, when executed by the at least one processor, cause the at least one processor to:
   receive from the customer a first threshold amount and a period length;
   receive an electronic transaction indication for each debit transaction made by the customer during a first period, wherein a length of the first period is equal to the period length, wherein a transaction indication comprises an amount of the debit transaction, and wherein the amount of the debit transaction is an amount deducted from a financial account of the customer as a result of the debit transaction;

when a sum of debit transactions made by the customer during the first period reaches the first threshold amount, send an electronic alert to a mobile device associated with the customer, wherein the electronic alert comprises an indication of the sum of the amounts of debit transactions made by the customer during the first period, an indication of the first threshold amount, and an indication of a portion of the financial account that is not committed to another use;

receive a transaction indication for each debit transaction made by the customer during a second period, wherein the second period begins at a conclusion of the first period, and wherein a length of the second period is equal to the period length; and when a sum of debit transactions made by the customer during the second period reaches a second threshold amount, send an electronic alert to the mobile device associated with the customer, wherein the electronic alert comprises an indication of the sum of the amounts of debit transactions made by the customer during the second period, an indication of the second threshold amount, and an indication of the portion of the financial account that is not committed to another use.

11. A computer readable medium having instructions thereon that when executed by at least one processor cause the at least one processor to:

receive from the customer a first threshold amount and a period length;

receive a electronic transaction indication for each debit transaction made by the customer during a first period, wherein a length of the first period is equal to the period length, wherein a transaction indication comprises an amount of the debit transaction, and wherein the amount of the debit transaction is an amount deducted from a financial account of the customer as a result of the debit transaction;

when a sum of debit transactions made by the customer during the first period reaches the first threshold amount, send an electronic alert to a mobile device associated with the customer, wherein the electronic alert comprises an indication of the sum of the amounts of debit transactions made by the customer during the first period, an indication of the first threshold amount, and an indication of a portion of the financial account that is not committed to another use;

receive a transaction indication for each debit transaction made by the customer during a second period, wherein the second period begins at a conclusion of the first period, and wherein a length of the second period is equal to the period length; and when a sum of debit transactions made by the customer during the second period reaches a second threshold amount, send an electronic alert to the mobile device associated with the customer, wherein the electronic alert comprises an indication of the sum of the amounts of debit transactions made by the customer during the second period, an indication of the second threshold amount, and an indication of the portion of the financial account that is not committed to another use.

12. A computer-implemented method for tracking customer spending, the method comprising:

receiving by a computer device and from the customer a first threshold amount related to a first category of debit transactions, a second threshold amount related to a second category of debit transactions, and a first period, wherein the computer device comprises at least one processor and operatively associated electronic memory;

receiving by the computer device a transaction indication for each debit transaction made by the customer during the first period, wherein a transaction indication comprises an amount of the debit transaction and a category of the debit transaction, and wherein the amount of the debit transaction is an amount deducted from a financial account of the customer as a result of the debit transaction;

when a sum of the amounts of debit transactions in the first category during the first period reaches the first threshold amount, sending, by the computer device, an electronic alert to a mobile device associated with the customer, wherein the electronic alert comprises an indication of the sum of the amounts of debit transactions in the first category made by the customer during the first period, an indication of the first threshold amount, and an indication of a portion of the financial account that is not committed to another use; and when a sum of the amounts of debit transactions in the second category during the first period reaches the second threshold amount, sending, by the computer device, an electronic alert to the mobile device associated with the customer, wherein the electronic alert comprises an indication of the sum of the amounts of debit transactions in the second category made by the customer during the first period, an indication of the second threshold amount, and an indication of the portion of the financial account that is not committed to another use.

13. The method of claim 12, further comprising sending a notification to the customer upon receiving each transaction indication, wherein the notification comprises an indication of the amount to be deducted from the financial account of the customer and a balance of the financial account considering the amount to be deducted from the financial account of the customer.

14. The method of claim 12, wherein the notification further comprises a category of the transaction.

15. The method of claim 12, further comprising:
receiving from the customer a third threshold amount related to the first category of debit transactions, wherein the third threshold amount is higher than the first threshold amount; and when the sum of debit transactions in the first category made by the customer during the first period reaches the third threshold amount, sending, by the computer device, an electronic alert to the mobile device associated with the customer, wherein the electronic alert comprises an indication of the sum of the amounts of debit transactions in the first category made by the customer during the first period, and an indication of the third threshold amount.

16. The method of claim 15, wherein the electronic alert sent when the sum of debit transactions in the first category made by the customer during the first period reaches the third threshold comprises an indication that the first threshold amount has already been exceeded during the first period.

17. The method of claim 12, further comprising preventing a debit transaction in the first category if completing the debit transaction would cause the sum of the amounts of debit transactions in the first category during the first period to exceed the first threshold amount.

18. The method of claim 12, wherein the mobile device is selected from the group consisting of a mobile phone; and a palmtop computer.

19. The method of claim 12, further comprising:
receiving from the customer a third threshold amount related to a third category of debit transactions; and
when a sum of debit transactions in the third category made by the customer during the first period reaches the third threshold amount, sending, by the computer device, an electronic alert to the mobile device associated with the customer, wherein the electronic alert comprises an indication of the sum of the amounts of debit transactions in the third category made by the customer during the first period and an indication of the third threshold amount.

20. The method of claim 12, wherein the first category is selected from the group consisting of groceries, utilities, auto expenses, clothing and entertainment.

21. A system for tracking customer spending, the system comprising at least one processor and operatively associated electronic memory, wherein the memory comprises instructions that, when executed by the at least one processor, cause the at least one processor to:
receive from the customer a first threshold amount related to a first category of debit transactions, a second threshold amount related to a second category of debit transactions, and a first period;
receive an electronic transaction indication for each debit transaction made by the customer during the first period, wherein a transaction indication comprises an amount of the debit transaction and a category of the debit transaction, and wherein the amount of the debit transaction is an amount deducted from a financial account of the customer as a result of the debit transaction; when a sum of debit transactions made by the customer in the first category during the first period reaches the first threshold amount, send an electronic alert to a mobile device associated with the customer, wherein the electronic alert comprises an indication of the sum of the amounts of debit transactions made by the customer in the first category during the first, an indication of the first threshold amount, an indication of a portion of the financial account that is not committed to another use; and
when the sum of debit transactions made by the customer in the second category during the first period reaches the second threshold amount, send an electronic alert to the mobile device associated with the customer, wherein the electronic alert comprises an indication of the sum of the amounts of debit transactions made by the customer in the second category during the first period, an indication of the second threshold amount, and an indication of the portion of the financial account that is not committed to another use.

22. A computer readable medium having instructions thereon that when executed by at least one processor, cause the at least one processor to:
receive an electronic transaction indication for each debit transaction made by the customer during the first period, wherein a transaction indication comprises an amount of the debit transaction and a category of the debit transaction, and wherein the amount of the debit transaction is an amount deducted from a financial account of the customer as a result of the debit transaction;
when a sum of debit transactions made by the customer in the first category during the first period reaches the first threshold amount, send an electronic alert to a mobile device associated with the customer, wherein the electronic alert comprises an indication of the sum of the amounts of debit transactions made by the customer in the first category during the first, an indication of the first threshold amount, and an indication of a portion of the financial account that is not committed to another use; and
when the sum of debit transactions made by the customer in the second category during the first period reaches the second threshold amount, send an electronic alert to the mobile device associated with the customer, wherein the electronic alert comprises an indication of the sum of the amounts of debit transactions made by the customer in the second category during the first period, an indication of the second threshold amount, an indication of the portion of the financial account that is not committed to another use.

23. A computer-implemented method for tracking customer spending, the method comprising:
receiving with a computer device and from the customer a first threshold amount related to a first category of debit transactions, a second threshold amount related to a second category of debit transactions, and a period length, wherein the computer device comprises at least one processor and operatively associated electronic memory;
receiving with the computer device an electronic transaction indication for each debit transaction made by the customer during a first period, wherein a length of the first period is equal to the period length, wherein a transaction indication comprises an amount of the debit transaction and a category of the debit transaction, and wherein the amount of the debit transaction is an amount deducted from a financial account of the customer as a result of the debit transaction;
when a sum of the amounts of debit transactions made by the customer in the first category during the first period reaches the first threshold amount, sending an electronic alert to a mobile device associated with the customer, wherein the electronic alert comprises an indication of the sum of the amounts of debit transactions in the first category made by the customer during the first period, an indication of the first threshold amount, and an indication of a portion of the financial account that is not committed to another use;
when a sum of the amounts of debit transactions made by the customer in the second category during the first period exceeds the second threshold amount, sending an electronic alert to the mobile device associated with the customer, wherein the electronic alert comprises an indication of the sum of the amounts of debit transactions made by the customer in the second category during the first period, an indication of the second threshold amount, and an indication of the portion of the financial account that is not committed to another use;
receiving with the computer device a transaction indication for each debit transaction made by the customer during a second period, wherein the second period begins at a conclusion of the first period, and wherein a length of the second period is equal to the period length;
when a sum of the amounts of debit transactions made by the customer in the first category during the second period reaches the first threshold amount, sending an electronic alert to the mobile device associated with the customer, wherein the electronic alert comprises an indication of the sum of the amounts of debit transactions made by the customer in the first category during the second period, an indication of the first threshold amount, and an indication of the portion of the financial account that is not committed to another use; and when a sum of the amounts of debit transactions in the second category during the second period exceeds the second threshold amount, sending an electronic alert to the mobile device, wherein the electronic alert comprises an indication of the sum of the amounts of debit transactions in the second category during the second period, an indication of the second threshold amount, and an indication of the portion of the financial account that is not committed to another use.

\* \* \* \* \*